(12) United States Patent
Hietaniemi et al.

(10) Patent No.: US 10,858,782 B2
(45) Date of Patent: Dec. 8, 2020

(54) METHOD FOR DEWATERING OF SLUDGE FROM A PULP, PAPER OR BOARD MAKING PROCESS

(71) Applicant: Kemira Oyj, Helsinki (FI)

(72) Inventors: Matti Hietaniemi, Espoo (FI); Rosa Carceller, Espoo (FI); Asko Karppi, Turku (FI); Joonas Likander, Espoo (FI); Jyri Välimäki, Nokia (FI)

(73) Assignee: Kemira Oyj, Helsinki (FI)

( * ) Notice: Subject to any disclaimer, the term of this patent is extended or adjusted under 35 U.S.C. 154(b) by 51 days.

(21) Appl. No.: 16/462,570

(22) PCT Filed: Dec. 15, 2017

(86) PCT No.: PCT/FI2017/050898
§ 371 (c)(1),
(2) Date: May 21, 2019

(87) PCT Pub. No.: WO2018/109280
PCT Pub. Date: Jun. 21, 2018

(65) Prior Publication Data
US 2020/0063340 A1   Feb. 27, 2020

(30) Foreign Application Priority Data
Dec. 16, 2016   (FI) ..................... 20165978

(51) Int. Cl.
| | | |
|---|---|---|
| *D21C 9/18* | (2006.01) | |
| *D21C 5/02* | (2006.01) | |
| *D21H 21/10* | (2006.01) | |
| *D21H 17/45* | (2006.01) | |
| *D21H 23/04* | (2006.01) | |
| *C02F 1/54* | (2006.01) | |
| *C02F 11/125* | (2019.01) | |
| *C02F 11/147* | (2019.01) | |
| *C02F 11/126* | (2019.01) | |
| *C02F 103/28* | (2006.01) | |

(52) U.S. Cl.
CPC ............ *D21C 9/18* (2013.01); *C02F 1/547* (2013.01); *C02F 11/125* (2013.01); *C02F 11/126* (2013.01); *C02F 11/147* (2019.01); *D21C 5/027* (2013.01); *D21H 17/45* (2013.01); *D21H 17/455* (2013.01); *D21H 21/10* (2013.01); *D21H 23/04* (2013.01); *C02F 2103/28* (2013.01)

(58) Field of Classification Search
None
See application file for complete search history.

(56) References Cited

U.S. PATENT DOCUMENTS

| | | | |
|---|---|---|---|
| 2002/0188040 A1* | 12/2002 | Chen .................... | D21H 21/56 524/35 |
| 2005/0182181 A1 | 8/2005 | Struck et al. | |
| 2006/0142464 A1 | 6/2006 | Hahn et al. | |
| 2009/0188639 A1* | 7/2009 | Chen .................... | C09K 8/5083 162/164.5 |
| 2012/0101194 A1 | 4/2012 | Broecher et al. | |
| 2015/0197439 A1 | 7/2015 | Zou et al. | |

FOREIGN PATENT DOCUMENTS

| | | |
|---|---|---|
| EP | 0764140 B1 | 3/1997 |
| WO | 2016030407 A1 | 3/2016 |
| WO | 2016034776 A1 | 3/2016 |

OTHER PUBLICATIONS

Finnish Patent Office, Search Report of FI20165978 dated Jun. 19, 2017, 2 pages.

* cited by examiner

*Primary Examiner* — Dennis R Cordray
(74) *Attorney, Agent, or Firm* — Berggren LLP

(57) ABSTRACT

A method is disclosed for dewatering of sludge from a pulp, paper or board making process, such as deinking sludge, including obtaining of an aqueous sludge including an aqueous phase and a fibre material suspended in the aqueous phase. The sludge is subjected to a pre-thickening step, where a first part of the aqueous phase is removed from the sludge and to a pressing step, where a second part of the aqueous phase is removed from the sludge, thereby obtaining a dry pressed sludge. Before or at the pre-thickening step a polymer composition having a charge density of at the most 1.7 meq/g, preferably at most 1.5 meq/g, more preferably at most 1.1 meq/g, is added to the sludge.

20 Claims, No Drawings

METHOD FOR DEWATERING OF SLUDGE FROM A PULP, PAPER OR BOARD MAKING PROCESS

PRIORITY

This application is a U.S. national application of the international application number PCT/FI2017/050898 filed on Dec. 15, 2017 and claiming priority of Finnish application 20165978 filed on Dec. 16, 2016 the contents of all of which are incorporated herein by reference.

Various sludges comprising solid materials and/or microorganisms suspended in an aqueous phase are dewatered in industrial processes. Sludges may be conditioned before thickening and dewatering by addition of chemicals, such as inorganic compounds of iron and lime, or organic compounds, such as polymer coagulants and flocculants. The chemicals are added to improve the sludge handling, to coagulate and/or flocculate the suspended matter into larger agglomerates and to increase dewatering effect.

In making of pulp, paper or board polymers are commonly used for dewatering sludge, such as deinking sludge from processes that use recycled fibres. Deinking sludge comprises, i.a. ink, polymeric materials, inorganic fillers and short fibres. Pulp, paper and board making processes comprise also other sludges, which generally contain fibre material and which are demanding to dewater efficiently. Especially sludges, such as mixed sludges, which have high pH and/or where the water phase has high conductivity and/or high cationic demand, are demanding for dewatering. High pH and/or conductivity disturb the functioning of the used polymers. Effective dewatering of sludge is however needed for further handling and/or use of the sludge, for example, as a fuel in incinerators.

There is a need for new effective method that can be used for dewatering sludge from a pulp, paper or board making.

An object of this invention is to minimise or even eliminate the disadvantages existing in the prior art.

An object is also to provide a method, which provides a high solids content after sludge dewatering and a good filtrate quality.

A further object of this invention is to provide a method which is effective for sludge dewatering, even at high pH and/or high conductivity and/or high cationic demand.

These objects are attained with the invention having the characteristics presented below in the characterising part of the independent claim. Some preferable embodiments are disclosed in the dependent claims.

The embodiments mentioned in this text relate, where applicable, to all aspects of the invention, even if this is not always separately mentioned.

A typical method according to the present invention for dewatering of sludge from a pulp, paper or board making process, such as deinking sludge, comprises obtaining an aqueous sludge comprising an aqueous phase and fibre material suspended in the aqueous phase, subjecting the sludge for a pre-thickening step where a first part of the aqueous phase is removed from the sludge, subjecting the sludge to a pressing step, where a further second part of the aqueous phase is removed from the sludge, and obtaining dry pressed sludge, adding to the aqueous sludge before or at the pre-thickening step a polymer composition having a charge density of at the most 1.7 meq/g, preferably at the most 1.5 meq/g, more preferably at the most 1.1 meq/g, and comprising a cationic synthetic first polymer, which has a charge density at least 1.0 meq/g at pH 2.8, a cationic second polymer, which is a copolymer obtained by polymerisation of of (meth)acrylamide and at least one cationic second monomer, the amount of cationic monomer being 2-19 weight-%, calculated from the total amount of the monomers, the second polymer being polymerised in presence of the cationic first polymer, wherein the first polymer has a higher charge density than the second polymer.

Now it has been surprisingly found out that a method where a specified polymer composition is added to the sludge provides unexpectedly improved dewatering results for sludge comprising fibre material, especially at high sludge pH and/or conductivity and/or high cationic demand. The specified polymer composition successfully flocs the sludge and binds the solid fines, such as inorganic or organic small particles, to the fibre material, even in the presence of disturbing anionic particles or substances. It is assumed, without wishing to be bound by a theory that the first polymer of the polymer composition effectively interacts with the disturbing anionic substances which enables an efficient flocculation of the remaining sludge constituents with the second polymer of the polymer composition. In this manner the flocculation ability of the polymer composition is not consumed by the disturbing substances but preserved for the constituents capable of forming strong flocs. Further, use of the polymer composition provides enhanced floc stability especially in two-stage sludge thickening comprising a pre-thickening step and a pressing step.

In the present context the aqueous sludge is understood as sludge, which comprises an aqueous phase and solid material, preferably fibre material, suspended in the aqueous phase, and which is a reject from paper, board or tissue making or from a similar process. The fibre material is cellulosic fibre material originating from wood or non-wood sources, preferably from wood sources. The fibre material is here understood as the long fibre fraction, which is retained on 100 mesh metal wire screen. In the present context, the long fibres are also denoted as usable fibres, and these terms are synonymous and fully interchangeable. The sludge may comprise long fibre material in amount of 1-50 weight-%, preferably 2-50 weight-%, more preferably 5-30 weight-%, even more preferably 7-20 weight-%, calculated from the dry weight of the sludge. Even if sludge comprises fibre material, even long fibre material, it is not usable for making of paper, board or tissue but forms a part of the reject flows in the process. The fibre material may also comprise a short fibre fraction, which includes short fibres, which permeate 100 mesh metal wire screen. In general, the fines fraction of the sludge, which permeates the 100 mesh metal wire screen, comprises in addition of short fibre material, also fibre fines, inorganic particles, colloidal material, various particular material, such as stickies, plastic particles and the like. The fines fraction of the sludge is generally unsuitable for manufacture of paper, board, tissue or the like. According to one embodiment, the sludge may comprise fines fraction in amount of >40 weight-%, preferably >50 weight-%, more preferably >60 weight-%, calculated from the dry weight of the sludge. For example, the sludge may comprise fines fraction in amount of 40-99 weight-%, preferably 45-95 weight-%, more preferably 50-90 weight-%, calculated from the dry weight of the sludge. In general, sludge may typically comprise at least one of the following material fractions: sand, plastic particles, stickies, shives, fibre bundles printing inks. Furthermore, the aqueous phase of the sludge may at least partly originate from washing water or reject water from making of paper, board, tissue or the like.

Further, the aqueous sludge may comprise inorganic mineral particles and have ash content in the range of 20-90%, preferably 20-85%, given as weight-% of solids. Ash content is determined by using Standard ISO 1762, temperature 525° C. The inorganic mineral particles in the sludge originate from fillers and coating materials used in paper and board making. Typically aqueous sludges from paper or board making and comprising inorganic mineral particles have been demanding to dewater. Inorganic mineral particles have usually high specific surface area and they increase the chemical demand and restrict the available chemicals. It was unexpectedly found out that the use of the present polymer composition works well even with sludges that have high ash content, i.e. inorganic particle content.

The aqueous sludge may have a solids content in the range of 1-5 weight-%, preferably 1.5-4 weight-%, before the pre-thickening step and before the addition of the polymer composition.

The polymer composition is thus added to the sludge prior or at the thickening stage, which comprises a pre-thickening step and a pressing step. The polymer composition is added to the sludge before or at, preferably before, the pre-thickening step, where a first part of the aqueous phase is removed from the sludge. Pre-thickening may be performed e.g. by using a thickening drum, gravity table or gravity belt, i.e. at free drainage without applied pressure. Pre-thickening step may take 5-30 s, typically 10-20 s.

The thickening stage thus comprises a mechanical pre-thickening step, where the solids content of the sludge is increased by separation of water. Pre-thickening may be performed without active suction, or preferably the mechanical pre-thickening may be performed at free drainage without applied pressure. The solids content of the sludge may be 5-14 weight-%, preferably 7-13 weight-%, after the mechanical pre-thickening step.

According to one embodiment of the invention the polymer composition is added to the sludge 1 s-10 min, preferably 1-20 s, before the pre-thickening step. The polymer composition flocculates the solid material present in the sludge, such as fibres and inorganic particles, providing an optimal floc size for dewatering and a good floc stability in two-stage thickening. Thus the formed flocs do not take up too much water, the water is released more easily from the flocs and the flocs are not broken under pressure or between different process stages. Furthermore, it is possible to obtain faster dewatering rate both at free drainage in the pre-thickening step as well as under pressure in the pressing step.

After the pre-thickening step the sludge is subjected to a pressing step where a further second part of the aqueous phase is removed from the sludge under a pressure or force and dry pressed sludge is obtained. Pressing step may take 1-20 min, typically 2-20 min. The pressing step may be performed by using, for example, a screw press, belt filter or the like, preferably a screw press. According to one preferable embodiment the dry pressed sludge exiting the pressing step has a solids content of at least 30 weight-%, preferably 45 weight-%, more preferably at least 50 weight-%, sometimes even at least 60 weight-%. For example, after the pressing step the sludge may have a solids content in the range of 30-75 weight-%, preferably 48-65 weight-%. The high solids content of the sludge makes it suitable for incineration or further processing for landfills or the like. The sludge may exit the pressing step as non-continuous sheet or in form of irregular lumps.

According to one preferable embodiment the aqueous sludge is deinking sludge. Deinking sludge contains fibre material comprising both short and long fibre fractions, inorganic mineral material from coating and/or fillers, as well as ink particles. The deinking sludge may comprise 7-20 weight-% of long fibre material, calculated from the dry weight of the sludge. Deinking sludge may have an Effective Residual Ink Concentration (ERIC), measured at 950 nm, which is >500, preferably >1000. Suitable instrument available for ERIC measurements are commercially available, e.g. from Technidyne, Inc., USA. The ash content of the deinking sludge is preferably 40-80%, more preferably 50-65%, determined by using Standard ISO 1762, temperature 525° C. According to one embodiment of the invention the aqueous sludge is deinking sludge from repulping process of newsprint and/or magazine paper. According to one embodiment of the invention the aqueous sludge is deinking sludge from repulping process of office paper, such as mixed office waste or sorted office waste. The present method is especially suitable for effective dewatering of deinking sludges, even if the fibre content of the sludge is low.

According to another preferable embodiment the aqueous sludge is mixed sludge from manufacture of pulp, paper, board or the like. Mixed sludge may be a mixture of various sludges from wastewater treatment of paper or board manufacture, such as primary sludge from a primary clarifier and biological sludge from biological stage. Mixed sludge may further comprise one or more of the following: chemical sludge from a tertiary treatment, deinking sludge, recycled fibre sludge, debarking sludge and/or anaerobic sludge from anaerobic stage. Mixed sludge is anionic (determined by using Mütek titration), and it may contain fibre material comprising both short and long fibre fractions (as defined above) as well as inorganic mineral material from coating minerals and/or fillers, and optionally also ink particles. The mixed sludge may have long fibre content in the range of 1-50 weight-%, preferably 2-50 weight-%, more preferably 2-20 weight-%, calculated from the dry weight of the sludge. Sometimes the mixed sludge may have fibre content in the range of 10-50 weight-%, calculated from the dry weight of the sludge. Mixed sludge may have solids content in the range of 1-5 weight-%. pH of the liquid phase of the mixed sludge may be in the range of 6-9. Often the liquid phase of the mixed sludge has conductivity in the range of 0.5-2.5 mS/cm. The cationic demand of the liquid phase may be 100-1500 μeq/l.

According to one embodiment of the invention the aqueous sludge is sludge from repulping process of old corrugated containerboard (OCC), comprising screen rejects, and thus having a relatively high long fibre content of 30-99 weight-%, typically 40-90 weight-%, calculated from the dry weight of the sludge, and an ash content of 3-20%, preferably 5-10%. The sludge from repulping process of old corrugated containerboard (OCC) may comprise stickies and/or plastic particles.

The aqueous phase of the sludge may have a cationic demand in the range of 200-2000 μeq/l, preferably 400-1500 μeq/l, more preferably 500-1500 μeq/l. The conductivity of the aqueous phase may be up to 8 mS/cm when the sludge originates from repulping of OCC. Typically the conductivity is in the range of 1-5 mS/cm, preferably 1.5-4 mS/cm, more preferably 2-3.5 mS/cm, especially when the sludge is deinking sludge. These values are measured from the aqueous phase, which is obtained by filtering the sludge through a black ribbon filter paper, before the addition of the polymer composition to the sludge. The cationic demand is measured by Mütek titration. pH of the aqueous phase may be 6.5-9.5, preferably 7-8.5, more preferably 7-8. Use of the present polymer composition enables dewatering of sludges where the aqueous phase shows high level of disturbing anionic substances, indicated by high cationic demand and/or conductivity.

The polymer composition which is suitable for use in the present method comprises a cationic synthetic first polymer and a second polymer, which is a copolymer of (meth) acrylamide and at least one cationic second monomer, the second polymer being polymerised in presence of the cationic first polymer. It has been observed that the use of this kind of a polymer composition improves the sludge dewatering, especially when the sludge has high conductivity and/or cationic demand.

The cationic synthetic first polymer may be obtained either by radical polymerisation or condensation polymerisation.

The cationic synthetic first polymer may be prepared in a polymerisation reactor by polymerising suitable monomers. After the polymerisation reaction is completed the first polymer is preferably free of reactive polymerisable groups, such as double carbon-carbon bonds, in its structure. In a preferable embodiment the monomers of the second polymer, when polymerised in the presence of the first polymer, are reacting with each other and not forming covalent bonds with the first polymer, which is present as polymerisation matrix. Thus the first polymer is preferably present essentially only as polymerisation matrix.

The cationic synthetic first polymer has a weight average molecular weight MW in the range of 1000-300 000 g/mol, preferably 1000-200 000 g/mol. Preferably the cationic synthetic first polymer may have a weight average molecular weight MW<150 000 g/mol, preferably <100 000 g/mol, more preferably <50 000 g/mol, even more preferably <20 000 g/mol. According one embodiment of the invention the cationic synthetic first polymer may have a weight average molecular weight MW in the range of 1000-150 000 g/mol, preferably 1500-100 000 g/mol, more preferably 1500-50 000 g/mol, even more preferably 2000-20 000 g/mol. It has been observed that the cationic synthetic first polymer is more effective in interacting with the sludge substances, such as anionic particular material when its molecular weight is low. The weight average molecular weight is determined by using size-exclusion chromatography (SEC), such as gel permeation chromatography, using procedures well known to a skilled person and based on calibration with polyethylene oxide standards.

The cationic synthetic first polymer typically may have a charge density of at least 1.0 meq/g, measured at pH 2.8. According to one preferable embodiment the cationic synthetic first polymer may have a charge density in the range of 1-12 meq/g, preferably 1-8 meq/g, more preferably 1.3-8 meq/g, even more preferably 5-8 meq/g, sometimes even more preferably 7-8 meq/g, measured at pH 2.8. In some embodiments the charge density may be 1.5-6.5 meq/g. The charge density of the cationic synthetic first polymer can be calculated theoretically when the amount of structural units carrying cationic charge in the polymerisation is known.

It has been unexpectedly observed that the low weight and suitable charge density of the cationic synthetic first polymer enhance its interaction with disturbing anionic substances that are present in the sludge. It is assumed without being bound by the theory that the cationic synthetic first polymer interacts with the small anionic particular material, while the second polymer is more active in floc formation.

The polymer composition may comprise cationic synthetic first polymer in amount of 0.5-10 weight-%, preferably 1.5-8 weight-%, more preferably 4-8 weight-%, calculated from the total dry polymeric material weight of the polymer composition.

The cationic synthetic first polymer may be selected from polyamines, such as copolymers of epichlorohydrin and dimethylamine, copolymers of epichlorohydrin, dimethylamine and ethylenediamine, linear or cross-linked polyamidoamines, polyvinylamine or at least partially hydrolyzed poly(N-vinylformamide). The weight average molecular weight of polyamine may be 1000-300 000 g/mol, preferably 1000-120 000 g/mol, more preferably 2000-20 000 g/mol.

The cationic synthetic first polymer may be obtained by non-radical polymerisation. Polyamines selected from copolymers of epichlorohydrin and dimethylamine, copolymers of epichlorohydrin, dimethylamine and ethylenediamine, as well as from linear and cross-linked polyamidoamines may be obtained by condensation polymerisation. The polyamines may possess high cationic charge which improves their interaction with anionic material in the sludge.

When the cationic synthetic first polymer is obtained by non-radical polymerisation, the polymer composition may comprise cationic synthetic first polymer in amount of 0.5-10 weight-%, preferably 1.5-8 weight-%, more preferably 4-8 weight-%, calculated from the total dry polymeric material weight of the polymer composition.

According to one preferable embodiment of the invention, the first polymer is polyamine, obtained by non-radical polymerisation, and the polymer composition comprises polyamine in amount of 0.5-10 weight-%, preferably 1.5-8 weight-%, more preferably 4-8 weight-%, calculated from the total dry polymeric material weight of the polymer composition.

Alternatively, the synthetic cationic first polymer may be obtained by radical polymerisation and be a homopolymer of cationic first monomers. The cationic first monomers for homopolymer can be selected from group of 2-(dimethylamino)ethyl acrylate (ADAM), [2-(acryloyloxy)ethyl] trimethylammonium chloride (ADAM-Cl), 2-(dimethylamino) ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-di methylaminoethyl methacrylate di methylsulphate, [3-(acryloylamino)propyl] trimethylammonium chloride (APTAC), [3-(methacryloylamino)propyl]trimethylammonium chloride (MAPTAC), and diallyldimethylammonium chloride (DADMAC). Preferably the cationic first monomer for a homopolymer is [2-(acryloyloxy)ethyl] trimethylammonium chloride (ADAM-Cl) or diallyldimethylammonium chloride (DADMAC). For those of the listed monomers containing quaternary nitrogen in their structure, the cationicity is not pH dependent, which is a preferable feature.

According to one preferable embodiment the cationic synthetic first polymer is a homopolymer of [3-(acryloylamino)propyl] trimethylammonium chloride (APTAC), [3-(methacryloylamino)propyl] trimethylammonium chloride (MAPTAC), or diallyldimethylammonium chloride (DADMAC). These monomers provide cationic charge that is not pH dependent and the obtained polymer is also hydrolytically stable so that charge loss over time, due to hydrolysis, may be minimised. Even more preferably the cationic synthetic first polymer is homopolymer of diallyldimethylammonium chloride (DADMAC), because it is hydrolytically very stable. Preferably the polymer composition may comprise cationic synthetic first polymer in one of the amounts disclosed for first polymers obtained by radical polymerisation.

Alternatively, the synthetic cationic first polymer may be obtained by radical polymerisation and be a copolymer of acrylamide and a cationic first monomer, as listed above in connection with homopolymers. Preferably, the synthetic cationic first polymer may be obtained by radical polymerisation and be a copolymer of acrylamide and a cationic first monomer, which is diallyldimethylammonium chloride (DADMAC).

When the synthetic cationic first polymer is obtained by radical polymerisation the amount of cationic first monomers may be 0.5-10 weight-%, preferably 1.5-8 weight-%, more preferably 4-8 weight-%, calculated from the total dry polymeric material weight of the final polymer composition.

According to one preferable embodiment of the invention the synthetic cationic first polymer is a linear polymer. When the synthetic cationic polymer is a linear polymer the solubility of the polymer composition may be improved.

Preferably, the synthetic cationic first polymer is stable against hydrolysis.

According to one preferable embodiment the synthetic cationic first polymer is selected from polyamines, preferably from copolymers of epichlorohydrin and dimethylamine; copolymer of acrylamide and diallyldimethylammonium chloride (DADMAC); or homopolymer of diallyldimethylammonium chloride (DADMAC) or homopolymer of [2-(acryloyloxy)ethyl] trimethylammonium chloride (ADAM-Cl). According to one especially preferable embodiment the synthetic cationic first polymer is selected from polyamines, preferably from copolymers of epichlorohydrin and dimethylamine and copolymers of acrylamide and diallyldimethylammonium chloride (DADMAC).

The second polymer is a copolymer of (meth)acrylamide and at least one cationic second monomer, the amount of cationic second monomers being 2-19 weight-%, preferably 3-12 weight-%, more preferably 5-10 weight-%, calculated from the total dry polymeric material weight of the composition.

The second polymer is a copolymer of (meth)acrylamide and at least one cationic second monomer, the amount of cationic second monomers being 1-10 mol-%, preferably 1.5-6 mol-%, more preferably 2-5.5 mol-%, calculated from the total amount of the monomers.

The cationic second monomer may be selected from group comprising 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(di methylamino)ethyl acrylate di methylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC). For some of the listed monomers the cationicity changes as function of pH, for example they are more cationic at acidic pH but less cationic at neutral pH. Monomers that contain quaternary nitrogen in their structure provide cationic charge which is not pH dependent, and they are therefore preferred.

According to one preferable embodiment of the present invention the second polymer is a copolymer of acrylamide and [2-(acryloyloxy)ethyl]trimethylammonium chloride (ADAM-Cl), diallyldimethylammonium chloride (DADMAC), [3-(acryloylamino)propyl] trimethylammonium chloride (APTAC), [3-(methacryloylamino)propyl] trimethylammonium chloride (MAPTAC), or combination thereof. Preferably the second polymer is a copolymer of acrylamide and [2-(acryloyloxy)ethyl] trimethylammonium chloride (ADAM-Cl) or diallyldimethylammonium chloride (DADMAC). These monomers can be polymerised into high molecular weight polymers, which is beneficial for the flocking efficiency of the polymer composition. Additionally they provide cationic charge that is not dependent on pH. The amount of ADAM-Cl or DADMAC or the other said monomers may be 1-10 mol-%, preferably 1.5-6 mol-%, more preferably 2-5.5 mol-% or 0.5-3 mol-%, calculated from the total amount of the monomers of the polymer composition. The second polymer is preferably polymerised in the presence of first polymer, which is polyamine.

The cationic synthetic first polymer has a higher charge density than the second polymer. The difference in cationicity of the cationic synthetic first polymer and the second polymer is at least 3 mol-%, preferably at least 5 mol-%, more preferably at least 7 mol-%.

According to one embodiment of the invention the cationic synthetic first polymer has a higher charge density than the second polymer, and the difference in cationicity of the cationic synthetic first polymer and the second polymer is at least 1 meq/g dry, preferably at least 2 meq/g dry, more preferably at least 3 meq/g dry, even more preferably at least 4 meq/g dry, sometimes even at least 5 meq/g dry. It is believed that the higher the difference in cationicity, the more pronounced are the interactions between the first polymer and the anionic substances in the sludge. The highest differencies in cationicity are obtainable by selecting a polyamine and/or cationic homopolymer as the first polymer, and a second polymer comprising low amount of cationic monomers.

In one embodiment of the invention the first polymer is a homopolymer and the difference in cationicity of the cationic synthetic first polymer and the second polymer is at least 30 mol-%, preferably at least 90 mol-%, more preferably at least 94 mol-%. This may provide simultaneously an enhancement in flocculation as well as fixation, especially for sludges having cationic demand of at least 800 µeq/l.

Preferably the first and the second polymer are different from each other. Preferably the monomers used in polymerisation of the first polymer and the second polymer are different from each other.

The polymer composition may have a charge density of at the most 1.7 meq/g, preferably at the most 1.5 meq/g. According to one embodiment of the invention the charge density of the polymer composition may be in the range of 0.1-1.7 meq/g, preferably 0.1-1.5 meq/g, more preferably 0.7-2.0 meq/g. The charge density values can be measured by using Mütek at pH 7.0. It has been observed that when the polymer composition has charge density <1.7 meq/g, it is provides an excellent performance in dewatering and gives a filtrate of good quality. The polymer composition with charge density of <1.7 meq/g is especially suitable for dewatering of sludges having a high fibre and/or ash content.

The polymer composition may preferably be in form of a dry powder or particulate material or particulate product, and it is dissolved into the water and diluted to desired appropriate concentration before its use. The obtained polymer composition may be dried and optionally milled to a suitable particle size. According to one embodiment the dry polymer composition in form of particulate product or particulate material or powder may have a solids content of at least 80 weight-%, preferably at least 85 weight-%, more preferably at least 90 weight-%. Dry particulate polymer composition is easy and cost-efficient to transport and store, it remains stable for long periods of time and is resistant towards microbiological degradation.

According to one embodiment the polymer content in the polymer composition is at least 25 weight-%, preferably at least 60 weight-%, more preferably at least 80 weight-%. A polymer composition having lower polymer content, e.g. obtained by dispersion or emulsion polymerisation, has the advantage of easier dissolution. A polymer product having a higher polymer content, e.g. obtained by gel polymerisation, is more cost efficient in view of the logistics of the product. A high polymer content has the additional benefit of improved microbial stability.

According to one embodiment of the invention the polymer composition may have a standard viscosity in the range of 3-6 mPas, preferably 3.6-5.0 mPas, measured at 0.1 weight-% solids content in an aqueous NaCl solution (1 M), at 25° C., using Brookfield DVII T viscometer with UL adapter.

The dosage of the polymer composition may be <20 kg/ton dry sludge, and preferably >1 kg/ton dry sludge. According to one preferable embodiment of the invention the polymer composition is added to the sludge in amount of 0.5-3 kg, preferably 1-2 kg, given per ton dry sludge. For deinking sludge the dosage of the polymer composition may be in the range of 0.4-3 kg, preferably 0.5-2 kg, given per ton dry sludge. The amount of polymer composition needed for sludge dewatering is equivalent or preferably less than for similar conventional polymers.

According to one embodiment of the present invention it is possible to add bentonite, silica, flocculating agent(s), polymer coagulant(s) and/or inorganic coagulant(s) to the sludge before or after pre-thickening step. Flocculating agent(s) can be selected from anionic or cationic polyacrylamides. Polymer coagulants can be polyamine or poly-DADMAC and inorganic coagulant can be selected from polyaluminum chloride ferrous sulphate or ferric sulphate.

EXPERIMENTAL

Some embodiments of the invention are described in the following non-limiting examples.

The apparatuses and methods used in the following examples are given in Table 1.

Usable, i.e. long, fibre content was determined by measuring 100 g of sludge to a 150 μm wire, where the distance between the wire threads is 150 μm, i.e. 100 mesh screen. The sludge was washed with running water until all other material except the fibres was washed off. After this the fibres were collected from the wire and dried in oven at 105° C. overnight. The dry fibres were weighed. Usable fibre content (150 μm wire) was calculated by using equation (1):

$$\text{Usable fibers (150 μm wire)} = \frac{\text{mass of dry fibers}}{\text{sludge dry solids} * \text{mass of sludge sample}} \quad (1)$$

Gravity dewaterability of sludge was tested with Polytest. The sludge samples were filtered with Polytest cylinder of 10 cm diameter using in the bottom a wire cloth having air permeability of 5400 m³/m² h. Treads/cm was 13.0/5.9. The sample amount was 200-400 g, but always identical between samples compared. Mixing of polymer composition was done with motor stirrer in baffled mixing vessel. Mixing speed was 600 rpm and mixing time was 10 seconds.

TABLE 1

Characterisation apparatuses and methods used in the examples.

| Property | Apparatus/Standard |
|---|---|
| pH | Knick Portamess 911 pH |
| Charge density | Mütek |
| Conductivity | Knick Portamess 911 Cond |
| Dry solids | SFS 3008 |
| Suspended solids | SFS 3008 |
| Ash (525° C.) | ISO 1762 |
| Turbidity | HACH 2100AN IS Turbidimeter// ISO 7027 |

Preparation of Polymer Compositions Used in the Examples

The cationic first polymer was polyamine (CAS #25988-97-0 or CAS #42751-79-1) or copolymer of acrylamide and diallyldimethylammonium chloride (CAS #26590-05-6).

The second polymer was copolymer of acrylamide and [2-(acryloyloxy)ethyl]trimethylammonium chloride (ADAM-Cl). Before the polymerisation of the second polymer the used monomers, the first polymer, pH adjustment agents (e.g. adipic acid, citric acid), chain transfer agent, chelating agent, redox initiators and thermal initiators in aqueous solutions were degassed with nitrogen. Acrylamide and ADAM-Cl monomers were added to a solution of the first host polymer. The obtained reaction solution was cooled down at −3° C., a redox initiator added and free radical polymerisation reaction started. The polymerisation was done in a batch reactor and it was adiabatic. After the polymerisation reaction was finished, the obtained polymer gel was processed with mince meat processor and dried in the oven overnight. After drying the polymer was ground to obtain a powder having a dry content about 90-93 weight-%.

Reference compositions R1, R2 and R3 were copolymers of acrylamide and [2-(acryloyloxy)ethyl] trimethylammonium chloride (ADAM-Cl).

Properties of the polymer compositions and reference compositions were classified as given in Table 2.

TABLE 2

Classification of standard viscosity and charge density ranges for polymer compositions and reference compositions.

| | CLASSIFICATION | | | |
|---|---|---|---|---|
| POLYMER PROPERTY | Very low | Low | Medium | High |
| Standard Viscosity, mPas | 3-4 | 3.5-4.5 | 4-5 | 4.5-5.5 |
| Charge Density, meq/g | 0.1-0.4 | 0.5-0.8 | 0.9-1.4 | — |

The polymer compositions and reference compositions are defined in Table 3.

TABLE 3

Compositions and properties of polymer compositions and reference compositions.

| Polymer Composition | 1st Polymer | | | 2nd Polymer, | Composition, | Standard |
| --- | --- | --- | --- | --- | --- | --- |
| | Type* | Amount, weight-% | Charge, mol-% | Charge, mol-% | Charge Density, meq/g dry | Viscosity, mPas |
| R1 (reference) | n.a. | 0 (n.a.) | n.a. | 1.5 | 0.2 | 6.1 |
| R2 (reference) | n.a. | 0 (n.a.) | n.a. | 5 | 0.6 | 4.9 |
| R3 (reference) | n.a. | 0 (n.a.) | n.a. | 10 | 1.2 | 4.0 |
| R4 (reference) | n.a. | 0 (n.a.) | n.a. | 5 | 0.6 | 4.2 |
| C1 | E | 6 | 100% E | 1.5 | 0.5 | 5.3 |
| C2 | E | 4 | 100% E | 1.5 | 0.5 | 4.8 |
| C3 | E | 8 | 100% E | 1.5 | 0.5 | 4.3 |
| C4 | E | 6 | 100% E | 5 | 0.9 | 5.6 |
| C5 | E | 6 | 100% E | 10 | 1.5 | 4.9 |
| D1 | F | 4 | 15 | 1.5 | 0.3 | 4.2 |
| D2 | F | 6 | 15 | 1.5 | 0.3 | 4.3 |
| D3 | F | 6 | 15 | 10 | 1.3 | 5.3 |
| D4 | F | 6 | 15 | 5 | 0.7 | 4.8 |
| D5 | F | 8 | 15 | 1.5 | 0.3 | 4.0 |

*E = polyamine, (CAS# 25988-97-0 or CAS# 42751-79-1), F = copolymer of acrylamide and diallyldimethylammonium chloride Used Sludges Properties of deinking pulp (DIP) sludges used in the Examples 1-4 are given in Table 4. Properties of mixed sludges used in Example 5 are also given in Table 5.

TABLE 4

Properties of sludges in the Examples.

| Property | Ex. 1 | Ex. 2 | Ex. 3 | Ex. 4 | Ex. 5, Test (a) | Ex. 5, Test (b) |
| --- | --- | --- | --- | --- | --- | --- |
| pH | 7.7 | 7.53 | 7.51 | 7.4 | 7.7 | 7.9 |
| Charge density, μeq/l | −410 | −270 | −1385 | −1562 | −780 | −1080 |
| Conductivity, mS/cm | 3.92 | 3.69 | 3.20 | 3.22 | 1.5 | 2.0 |
| Dry solids; % | 2.95 | 2.52 | 2.74 | 2.58 | 1.5 | 1.6 |
| Suspended solids, % | 2.3 | — | 2.23 | 2.01 | 1.4 | 1.5 |
| Usable fibres (150 μm wire), % | 11.35 | 9.47 | 9.89 | 12.82 | 8.3 | 5.5 |
| Ash (525° C.), % | 63.55 | 65.63 | 61.55 | 58.67 | 43 | 37 |

Example 1

Deinking pulp (DIP) sludge denotes sludge that is generated in processing and pulping of recycled paper. This example simulates dewatering process of newsprint DIP sludge. Measured sludge properties are presented in Table 4.

Polymer compositions were diluted to 0.1% concentration before dosing to the sludge. Dewatering rate was tested with Polytest as described above. Polymer composition doses were 1.0 and 1.5 kg/t dry sludge. Sludge sample amount was 400 g. Amount of drained water was measured after 10 and 25 seconds. After Polytest the sludge was pressed with Afmitec Friesland B.V.™ minipress for 60 seconds with 5 bar pressure. Dry solids content of the sludge was measured after the pressing. Results from these experiments are presented in Table 5.

From Table 5 it is seen that a polymer composition according to the present invention and having a medium charge density and high standard viscosity provides a better performance than conventional copolymer of acrylamide having medium charge density and high standard viscosity. The polymer composition according to the invention achieved faster dewatering, drainage after 10 and 25 seconds, as well as higher dry solids content after pressing than the reference polymer. All of these factors are advantageous for effective sludge dewatering in industrial scale.

TABLE 5

Results for drainage and dry solids after pressing.

| Polymer Composition | Polymer dose [kg/t DS] | Drainage 10 s [g] | Drainage 25 s [g] | Dry solids after pressing, [%] |
| --- | --- | --- | --- | --- |
| R3 (reference) | 1.0 | 225.5 | 288.8 | 58.8 |
| C5 | 1.0 | 255.2 | 305.8 | 60.2 |
| R3 (reference) | 1.5 | 293.8 | 315.5 | 58.6 |
| C5 | 1.5 | 306.5 | 318.5 | 60.7 |

Example 2

This example simulates dewatering process of newsprint DIP sludge. Measured sludge properties are presented in Table 4.

Polymer compositions were diluted to 0.1% concentration before dosing to the sludge. Dewatering rate was tested with Polytest as described above. Polymer doses were 0.9 kg/t dry sludge. Size of the sludge samples were 400 g. Amount of drained water was measured after 10 and 25 seconds. Suspended solids content was measured from the drained water. Results from these experiments are presented in Table 6.

TABLE 6

Results for drainage and reject water suspended solids.

| Polymer Composition | Drainage 10 s [g] | Drainage 25 s [g] | Reject water SS [mg/l] |
|---|---|---|---|
| R2 (reference) | 270.7 | 324.6 | 784.3 |
| D4 | 298.0 | 329.5 | 689.6 |

From Table 6 it is seen that a polymer composition according to the present invention provides a better performance than conventional copolymer of acrylamide having a low charge density and medium standard viscosity. The polymer composition according to the invention achieved faster dewatering as well as better reject water quality than the reference polymer. All of these factors are advantageous for effective sludge dewatering in industrial scale.

Example 3

This example simulates dewatering process of newsprint DIP sludge. Measured sludge properties are presented in Table 4.

Polymer compositions were diluted to 0.1% concentration before dosing to the sludge. Dewatering rate was tested with Polytest as described above. Polymer doses were 1.0 and 1.5 kg/t dry sludge. Size of the sludge samples were 400 g. Amount of drained water was measured after 10 and 25 seconds. Suspended solids content was measured from the drained water. After Polytest the sludge was pressed with Amfitec minipress for 60 seconds with 5 bar pressure. Dry solids content of the sludge was measured after the pressing. Results from these experiments are presented in Table 7.

TABLE 7

Results for drainage, reject water suspended solids and dry solids content after pressing.

| Polymer Comp. | Polymer dose [kg/t DS] | Drainage 10 s [g] | Drainage 25 s [g] | Reject water SS [mg/l] | DS after pressing [%] |
|---|---|---|---|---|---|
| R1 (reference) | 1.0 | 259 | 324 | 952 | 56.6 |
| C1 | 1.0 | 279 | 332 | 769 | 60.1 |
| R1 (reference) | 1.5 | 305 | 338 | 756 | n.a. |
| C1 | 1.5 | 324 | 341 | 535 | 58.9 |

From Table 7 it is seen that a polymer composition according to the present invention and having a very low charge density and low standard viscosity provides a better performance than conventional copolymer of acrylamide having very low charge density and medium standard viscosity. The polymer composition according to the invention achieved faster dewatering better reject water quality as well as higher dry solids content after pressing than the reference polymer. All of these factors are advantageous for effective sludge dewatering in industrial scale.

Example 4

This example simulates dewatering process of newsprint DIP sludge. Measured sludge properties are presented in Table 4.

Example 4 demonstrates the difference obtainable when a polymer composition is used according to the present invention and when a blend of corresponding individual polymers are used. The blend comprised 94 weight-% of polymer R1 and 6 weight-% of polyamine (CAS #25988-97-0 or CAS #42751-79-1). The blend was prepared by mechanical mixing of the two polymer composition solutions.

Polymer compositions were diluted to 0.1% concentration before dosing to the sludge. Dewatering rate was tested with Polytest as described above. Polymer doses were 0.75 and 1.0 kg/t dry sludge. Size of the sludge samples were 200 g. Amount of drained water was measured after 5 seconds. Turbidity and suspended solids content was measured from the drained water. Results from these experiments are presented in Table 8.

TABLE 8

Results for drainage, reject water suspended solids and turbidity.

| Polymer Composition | Polymer dose [kg/t DS] | Drainage 5 s [g] | Reject water turbidity, [NTU] | Reject water SS [mg/l] |
|---|---|---|---|---|
| Blend of R1 + polyamine, as defined above (reference) | 0.75 | 135 | 5245 | 1949 |
| C1 | 0.75 | 141 | 4300 | 1731 |
| Blend of R1 + polyamine, as defined above (reference) | 1.0 | 144 | 3105 | 1392 |
| C1 | 1.0 | 148 | 1536 | 1004 |

From Table 8 it is seen that a polymer composition according to the present invention and having a very low charge density and low standard viscosity provides a better performance than a blend of individual polymers corresponding the components of the composition. The polymer composition according to the invention achieved faster dewatering and better filtrate quality, which is advantageous for effective sludge dewatering in industrial scale. Example 4 demonstrates that the use of the polymer composition provides unexpected benefits over the use of a blend comprising similar individual components.

Example 5

Mixed sludge denotes sludge that is generated in effluent treatment process and it contains at least two different sludges. This example simulates dewatering process of mixed sludge which comprises primary clarifier sludge and biological sludge. Two tests using two different mixed sludges, Test (a) and Test (b), were conducted. Measured sludge properties are presented in Table 4.

Properties of polymer compositions used in Example 5 and their properties are presented in Table 9. In polymer composition C-inv the cationic first polymer was a condensation copolymer of epichlorohydrin and dimethylamine, having charge density about 7 meq/g dry. The first polymer was present in the final polymer composition in amount of 6 weight-%, based on weight of total polymeric material, as dry. The second polymer was copolymer of acrylamide, amount of monomers for the second polymer are shown in Table 9.

Reference polymers C-ref1 and C-ref2 were copolymers of acrylamide and ADAM-Cl.

TABLE 9

Properties of polymer compositions in Example 5. The amount of cationic first polymer in all final polymer compositions was 6 weight-%, based on weight of total polymeric material, as dry.

| Polymer | Amount Acrylamide [mol-%] | Amount ADAM-Cl [mol-%] | Polymer Composition Standard Viscosity [mPas] | Charge Density [meq/g dry] |
|---|---|---|---|---|
| C-inv | 95 ($2^{nd}$ polymer) | 5 ($2^{nd}$ polymer) | 4.2 | 1.33 |
| C-ref1 (reference) | 95 | 5 | 4.2 | 0.6 |
| C-ref2 (reference) | 95 | 5 | 4.9 | 0.6 |

Polymer compositions were diluted to 0.2% concentration before dosing to the sludge. Dewatering rate was tested with Polytest as described above. Polymer dose were 7.0 kg/t dry sludge. Size of the sludge samples were 500 g. Amount of drained water was measured after 10 and 25 seconds. Turbidity was measured from the drained water.

Test (a)

Sludge consisted of 40 volume-% of biological sludge and 60 volume-% of primary clarifier sludge. Mixed sludge properties are given in Table 4. Results are presented in Table 10.

TABLE 10

Results for drainage and reject water turbidity

| Polymer Composition | Polymer dose [kg/t DS] | Drainage 10 s [g] | Drainage 25 s [g] | Reject water turbidity, [NTU] |
|---|---|---|---|---|
| C-ref1 (reference) | 7.0 | 229 | 287 | 104 |
| C-inv | 7.0 | 245 | 321 | 53 |

Test (b)

Test (a) was repeated but the sludge was changed and consisted of 60 volume-% of biological sludge and 40 volume-% of primary clarifier sludge. Mixed sludge properties are given in Table 4. Results are presented in Table 11.

TABLE 11

Results for drainage and reject water turbidity.

| Polymer Composition | Polymer dose [kg/t DS] | Drainage 10 s [g] | Drainage 25 s [g] | Reject water turbidity, [NTU] |
|---|---|---|---|---|
| C-ref1 (reference) | 9.0 | 108 | 159 | 145 |
| C-ref2 (reference) | 9.0 | 66 | 109 | 155 |
| C-inv | 9.0 | 313 | 418 | 42 |

From Tables 10 and 11 it is seen that a polymer composition according to the present invention and having a medium charge density and high standard viscosity provides a better performance than conventional copolymer of acrylamide having medium charge density and high standard viscosity. The polymer composition according to the invention achieved faster dewatering, drainage after 10 and 25 seconds, as well as lower reject water turbidity than the reference polymers. Typically dewatering is hard when the amount of biological sludge increases in the mixed sludge. However, it can be seen from the results of Example 5 that the polymer composition according to the present invention and having a medium charge density and high standard viscosity performs significantly better than the reference compositions of conventional copolymer of acrylamide having medium charge density and high standard viscosity, even when amount of biological sludge in the mixed sludge is high. All of these factors are advantageous for effective sludge dewatering in industrial scale.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for dewatering of sludge from a pulp, paper or board making process, the method comprising:
   obtaining an aqueous sludge comprising an aqueous phase and a fibre material suspended in the aqueous phase,
   subjecting the sludge to a pre-thickening step, wherein a first part of the aqueous phase is removed from the sludge,
   subjecting the sludge to a pressing step, wherein a second part of the aqueous phase is removed from the sludge and obtaining a dry pressed sludge, and
   adding to the aqueous sludge before or at the pre-thickening step a polymer composition having a charge density of at most 1.7 meq/g, measured at a pH of 7, and comprising:
   a cationic synthetic first polymer, which has a charge density of at least 1.0 meq/g at a pH of 2.8, and
   a cationic second polymer, which is a copolymer obtained by polymerization of (meth)acrylamide and at least one cationic second monomer, the amount of the cationic monomers being 2-19 weight-%, calculated from a total amount of the monomers, the second polymer being polymerized in presence of the cationic first polymer,
   wherein the first polymer has a higher charge density than the second polymer.

2. The method according to claim 1, wherein the cationic first polymer has a charge density of 1-12 meq/g, at a pH of 2.8.

3. The method according to claim 2, wherein the cationic first polymer has a charge density of 1.3-8 meq/g, at a pH of 2.8.

4. The method according to claim 1, wherein the cationic first polymer is selected from polyamines, copolymers of epichlorohydrin, dimethylamine and ethylenediamine, linear or cross-linked polyamidoamines, polyvinylamine or at least partially hydrolyzed poly(N-vinylformamide).

5. The method according to claim 1, wherein the polymer composition comprises the cationic first polymer in an amount of 0.5-10 weight-%, calculated from a total dry polymeric material weight of the polymer composition.

6. The method according to claim 5, wherein the polymer composition comprises the cationic first polymer in an amount of 1.5-8 weight-%, calculated from the total dry polymeric material weight of the polymer composition.

7. The method according to claim 1, wherein the cationic first polymer is a copolymer of acrylamide and a cationic first monomer, which is diallyldimethyl-ammonium chloride (DADMAC), obtained by radical polymerization.

8. The method according to claim 1, wherein the cationic first polymer is obtained by radical polymerization and is a homopolymer of a cationic first monomer selected from of 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC).

9. The method according to claim 7, wherein an amount of the cationic first monomers is 0.5-10 weight-%, calculated from a total dry polymeric material weight of the polymer composition.

10. The method according to claim 9, wherein the amount of the cationic first monomers is 1.5-8 weight-%, calculated from the total dry polymeric material weight of the polymer composition.

11. The method according to claim 1, wherein the cationic first polymer has a weight average molecular weight MW<150,000 g/mol.

12. The method according to claim 1, wherein the cationic second monomer is selected from a group comprising 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC).

13. The method according to claim 1, wherein the composition has a standard viscosity in a range of 3-6 mPas measured at 0.1 weight-% solids content in an aqueous NaCl solution (1 M) at 25° C. using a Brookfield DVII T viscometer with a UL adapter.

14. The method according to claim 1, wherein the sludge comprises a long fibre material in an amount of 2-50 weight-%, calculated from a dry weight of the sludge.

15. The method according to claim 1, wherein the sludge comprises inorganic mineral particles and has an ash content in a range of 20-90%, measured by using Standard ISO 1762, temperature 525° C.

16. The method according to claim 1, wherein the sludge has solids content in a range of 1-5 weight-%.

17. The method according to claim 1, wherein the polymer composition is added to the sludge in an amount of 0.5-3 kg, given per ton dry sludge.

18. The method according to claim 1, wherein the dry pressed sludge has a solids content at least 45 weight-%.

19. The method according to claim 1, wherein the aqueous phase of the sludge has a cationic demand in a range of 200-2000 μeq/l and/or conductivity in a range of 1-5 mS/cm.

20. The method according to claim 1, wherein the polymer composition has a charge density of at most 1.5 meq/g, at a pH of 7.

* * * * *